(12) United States Patent
Stoll et al.

(10) Patent No.: US 11,929,881 B2
(45) Date of Patent: Mar. 12, 2024

(54) 3D VISUALIZATION OF MULTI-LAYER NETWORKS INCLUDING NETWORK TOPOLOGY AND ENCAPSULATION

(71) Applicant: Ciena Corporation, Hanover, MD (US)

(72) Inventors: Christopher Stoll, Sebastopol, CA (US); Brett Sinclair, Cambridge (CA); David Fortin, Stittsville (CA); Blair E. P. Moxon, Ottawa (CA); Christiane Louise Campbell, Ottawa (CA); Sophy Pal, Santa Rosa, CA (US); Brian Christopher Johnson, Nepean (CA); Hien Nguyen, Bowie, MD (US)

(73) Assignee: Ciena Corporation, Hanover, MD (US)

( * ) Notice: Subject to any disclaimer, the term of this patent is extended or adjusted under 35 U.S.C. 154(b) by 0 days.

(21) Appl. No.: 18/100,045

(22) Filed: Jan. 23, 2023

(65) Prior Publication Data

US 2023/0224224 A1    Jul. 13, 2023

Related U.S. Application Data

(63) Continuation of application No. 17/574,016, filed on Jan. 12, 2022, now Pat. No. 11,588,702.

(51) Int. Cl.
| | |
|---|---|
| *G06F 15/16* | (2006.01) |
| *G06F 3/04815* | (2022.01) |
| *H04L 41/12* | (2022.01) |
| *H04L 41/22* | (2022.01) |
| *G06F 3/04817* | (2022.01) |
| *G06F 3/04842* | (2022.01) |
| *G06F 3/0485* | (2022.01) |

(52) U.S. Cl.
CPC .......... *H04L 41/12* (2013.01); *G06F 3/04815* (2013.01); *H04L 41/22* (2013.01); *G06F 3/04817* (2013.01); *G06F 3/04842* (2013.01); *G06F 3/0485* (2013.01); *G06F 2203/04806* (2013.01)

(58) Field of Classification Search
CPC ..... H04L 41/12; H04L 41/22; G06F 3/04815; G06F 3/04817; G06F 3/04842; G06F 3/0485
USPC ......................................................... 709/224
See application file for complete search history.

(56) References Cited

U.S. PATENT DOCUMENTS

| | | | | |
|---|---|---|---|---|
| 6,112,015 | A | * | 8/2000 | Planas .................... H04L 41/22 715/764 |
| 6,137,782 | A | * | 10/2000 | Sharon .................... H04L 41/12 370/255 |

(Continued)

FOREIGN PATENT DOCUMENTS

EP    0928117 A3    4/2000

*Primary Examiner* — Moustafa M Meky
(74) *Attorney, Agent, or Firm* — Baratta Law PLLC; Lawrence A. Baratta, Jr.

(57) ABSTRACT

Three-dimensional (3D) visualization of multi-layer networks include receiving data associated with a network, wherein the network includes interconnected network elements that operate at a plurality of levels that include any of network layers and encapsulations; displaying a plurality of three-dimensional icons each represent one of a plurality of network elements of the interconnected network elements; and displaying links between the plurality of three-dimensional icons each link representing one of a network layer connection and an encapsulation connection.

20 Claims, 13 Drawing Sheets

(56) References Cited

U.S. PATENT DOCUMENTS

| | | |
|---|---|---|
| 6,732,170 B2 * | 5/2004 | Miyake .................... H04L 41/12 |
| | | 709/224 |
| 6,789,090 B1 * | 9/2004 | Miyake ................. H04L 41/024 |
| | | 707/999.104 |
| 6,941,359 B1 | 9/2005 | Beaudoin et al. |
| 7,096,502 B1 | 8/2006 | Fox et al. |
| 7,107,496 B1 | 9/2006 | D'Ippolito et al. |
| 7,149,975 B1 | 12/2006 | Johnson et al. |
| 8,117,314 B2 * | 2/2012 | Croft ....................... G06F 21/53 |
| | | 709/227 |
| 8,443,287 B2 | 5/2013 | Gooding et al. |
| 8,621,032 B2 * | 12/2013 | Battat ..................... H04L 41/22 |
| | | 709/217 |
| 8,782,187 B2 * | 7/2014 | Kumar ................. H04L 67/025 |
| | | 709/224 |
| 8,874,722 B2 | 10/2014 | Gooding et al. |
| 9,007,302 B1 * | 4/2015 | Bandt-Horn ............ G06F 3/044 |
| | | 345/156 |
| 9,241,281 B2 * | 1/2016 | Pulini ................... H04W 84/18 |
| 9,646,439 B2 * | 5/2017 | Ricci ..................... H04W 36/34 |
| 9,767,179 B2 | 9/2017 | Grignon et al. |
| 9,989,724 B2 * | 6/2018 | Raza ................. H04Q 11/0005 |
| 10,282,905 B2 | 5/2019 | Breedvelt-Schouten et al. |
| 10,778,537 B1 | 9/2020 | Hu et al. |
| 11,101,884 B1 | 8/2021 | Campbell et al. |
| 11,178,020 B2 | 11/2021 | Barton et al. |
| 11,496,817 B2 * | 11/2022 | MacKay ............ H04B 10/0795 |
| 11,588,702 B1 * | 2/2023 | Stoll ....................... H04L 41/12 |
| 11,669,542 B2 * | 6/2023 | Sharkov .................. G06F 16/26 |
| | | 707/722 |
| 2003/0193899 A1 | 10/2003 | Wang et al. |
| 2005/0044502 A1 * | 2/2005 | Fu .......................... H04L 41/22 |
| | | 715/713 |
| 2005/0050196 A1 * | 3/2005 | Aita .................... H04L 43/0811 |
| | | 709/239 |
| 2010/0138751 A1 * | 6/2010 | Kumar ............... H04L 43/0811 |
| | | 709/224 |
| 2013/0321458 A1 | 12/2013 | Miserendino et al. |
| 2014/0192645 A1 | 7/2014 | Zhang et al. |
| 2015/0220535 A1 | 8/2015 | Palmer et al. |
| 2018/0239522 A1 | 8/2018 | Campbell et al. |
| 2019/0215248 A1 | 7/2019 | D'Ippolito et al. |
| 2019/0347282 A1 | 11/2019 | Cai et al. |
| 2021/0160174 A1 | 1/2021 | Kashyap et al. |
| 2021/0319041 A1 * | 10/2021 | Sharkov ............... G06F 16/9024 |
| 2021/0376923 A1 | 12/2021 | Swinkels et al. |

* cited by examiner

3D VISUALIZATION OF MULTI-LAYER NETWORKS INCLUDING NETWORK TOPOLOGY AND ENCAPSULATION

CROSS-REFERENCE TO RELATED APPLICATION(S)

The present disclosure is a continuation of U.S. patent application Ser. No. 17/574,016, filed Jan. 12, 2022, the contents of which are incorporated in their entirety by reference.

FIELD OF THE DISCLOSURE

The present disclosure generally relates to network management systems and user interfaces (UI). More particularly, the present disclosure relates to systems and methods for three-dimensional (3D) visualization of multi-layer networks including network topology and encapsulation.

BACKGROUND OF THE DISCLOSURE

Networks are deployed with various layers (i.e., Open Systems Interconnection (OSI) stack—e.g., Layer 0—optical, Layer 1—time division multiplexed (TDM), layer 2—packet, etc.), various topologies, as well as various logical encapsulations. Also, there are well-known requirements for network management, namely, to visually display a network. As networks become more complex in terms of layers, topologies, and logical encapsulations, it is difficult to visualize all of this information in a UI. Conventional approaches to visualizing a network include:

1. Directed and undirected cyclic and acyclic graphs which are two-dimensional visualizations that connect nodes (points of contact in the graph) with edges (lines indicating relationships between two nodes). These are often referred to as "schematic views" or "subway maps." These views are limited to two dimensions and are often thought of as being viewed "top-down," as though they were printed on paper and being looked at on a table.

2. Layer-based two-dimensional visualizations that specifically diagram the multiple network layers in a physical network. Often referred to as "logical views" or "layered views." These views show the end-to-end connectivity of a given network context in the horizontal dimension, and the logical layers of network encapsulation in the vertical dimension.

3. Linear, two-dimensional depictions of an end-to-end data path, e.g., "subway lines". These views typically exist for a single end-to-end path context.

4. Other "pseudo-3D" network graphs. These include isometric views of layered two dimensional drawings to give an appearance of three dimensions, but without the interactivity of a full three-dimensional model or display.

Because the approaches described above are rendered in only two dimensions, they are limited as to the amount and nature of data they can display in a single rendering. This forces the user to often choose which data they are most interested using checkboxes, drop-down lists, and other user interface elements, and then to switch back and forth between alternate renderings that are based on their choices. This forces the user to lose context and information between views, making it difficult to use visualization techniques to make complicated constructs fully comprehensible with a single glance at a single rendering.

Similarly, existing solutions that map logical network connectivity contexts into two-dimensional renderings often require a very large visual representation in order to show all the related data. This forces the user to either "zoom" the view out to fit the entire diagram on the screen, thereby making the individual elements of the diagram too small to effectively view, or to "pan" or "scroll" the view around, thereby allowing the user to only see one region of the diagram at a time, again forcing the user to lose context.

The known solutions require either changing views or reducing the detail of the current view in order to "drill-down" into additional contextual scope, sacrificing the contextual information in the first view for that gained in the second. In order to make decisions that require comparison between information present in the disparate views, the user is forced to switch back and forth between them. The known solutions cannot show the same physical entity's participation in a multitude of logical network roles simultaneously, forcing the user to switch between a "layer 2" view of the network, or a "layer 3" view of the network, or a "layer 0 (optical)" view of the network.

The known solutions require the user to choose between either a two-dimensional topological view or a two-dimensional line view in order to see a network path traced through the context in question, this does not allow the user to see in one serialized representation the exact path that a signal takes through the topology as well as through the devices themselves in one coherent representation. The known solutions are not able to preserve context when switching between views as they do not operate within the framework of an animated three-dimensional interactive environment. For example, in known solutions, when the layout of the two-dimensional topological view must change, the user is forced to mentally re-locate all the items on the screen after a new layout is rendered.

No known solution uses three dimensions simultaneously to show both topological or geographical network layout and logical network encapsulation for any arbitrary connectivity context in the network, at any arbitrary level of detail.

BRIEF SUMMARY OF THE DISCLOSURE

The present disclosure relates to systems and methods for three-dimensional (3D) visualization of multi-layer networks including network topology and encapsulation. Specifically, the present disclosure includes UI approaches for visualizing a network in a 3D view that simultaneously displays arbitrary levels of both two-dimensional topological context and logical encapsulation context. This enables an ability to i) trace logical service paths in three dimensions through topological and logical infrastructure, ii) display a network element in three dimensions in arbitrary network roles, iii) display operations, administration, and maintenance (OAM) statuses for a multitude of network roles on a single network element simultaneously, iv) intelligently detect redundant or obvious network layer or topology information and condense the depiction by collapsing congruent layers, v) hide or show arbitrary layers to see highly encapsulated services directly over low-layer infrastructure, vi) overlay OAM information in various levels of detail simultaneously, vii) show animation between visual depiction states of the display to preserve network context, and the like.

In various embodiments, the present disclosure includes a method having steps, a system including at least one processor and memory with instructions that, when executed, cause the at least one processor to implement the steps, and a non-transitory computer-readable medium having instructions stored thereon for programming at least one processor to perform the steps. The steps can include receiving data from a network that includes a plurality of network elements that operate at a plurality of levels that include any of network layers and encapsulations; displaying any of the plurality of network elements as a three-dimensional icon on a network map; illustrating a plinth in the three-dimensional icon for each of the plurality of levels for each network element of the any of the plurality of network elements, wherein a plinth at each level indicates a corresponding network element participates in that level; and illustrating horizontal connectivity as links between any of the network elements via associated plinths. The steps can further include receiving a selection on any link and one of expanding or collapsing the three-dimensional icon based thereon.

The network layers include any of optical, time division multiplexed, and packet. The encapsulations can include protocols within the network layers. The plurality of levels can include a combined level for any of fiber, optical transport network, and optical data unit. The encapsulations can include any of link layer discovery protocol (LLDP), internet protocol (IP), tunnel, ethernet virtual circuit (EVC), virtual private network (VPN), multiprotocol label switching (MPLS), and segment routing.

The steps can further include displaying operations, administration, and maintenance (OAM) information in the plurality of levels at the same time when the three-dimensional icon is expanded. The steps can further include tracing a service from a source to a destination and through the plurality of levels at any of the plurality of network elements. The steps can further include illustrating traced paths relative to lower levels to visualize protection and diversity. The steps can further include, responsive to user input, any of panning, rotating, zooming in or out in the network map, and adding/removing information.

BRIEF DESCRIPTION OF THE DRAWINGS

The present disclosure is illustrated and described herein with reference to the various drawings, in which like reference numbers are used to denote like system components/ method steps, as appropriate, and in which.

DETAILED DESCRIPTION OF THE DISCLOSURE

The present disclosure relates to systems and methods for three-dimensional (3D) visualization of multi-layer networks including network topology and encapsulation. Specifically, the present disclosure includes UI approaches for visualizing a network in a 3D view that simultaneously displays arbitrary levels of both two-dimensional topological context and logical encapsulation context. This enables an ability to i) trace logical service paths in three dimensions through topological and logical infrastructure, ii) display a network element in three dimensions in arbitrary network roles, iii) display operations, administration, and maintenance (OAM) statuses for a multitude of network roles on a single network element simultaneously, iv) intelligently detect redundant or obvious network layer or topology information and condense the depiction by collapsing congruent layers, v) hide or show arbitrary layers to see highly encapsulated services directly over low-layer infrastructure, vi) overlay OAM information in various levels of detail simultaneously, vii) show animation between visual depiction states of the display to preserve network context, and the like.

The present disclosure relates to network management systems and methods utilizing 3D visualization. A network includes a plurality of network elements (which may be referred to as nodes, switches, routers, terminals, add/drop multiplexers, and the like) that interconnect to one another. At the optical layer (referred to as Layer 0), the connectivity is physical via optical fiber. At other higher layers, the connectivity is logical via bits, frames, packets, labels, segment identifiers (SIDs), etc.

FIGS. 1-26 are screenshots of a UI 10 for 3D visualization of a network 12.

The present disclosure includes three-dimensional rendering techniques in a web browser or other application to create interactive visual depictions of arbitrary physical and logical network contexts. This allows those who administer, provision, and maintain these networks to visually contemplate a physical or logical representation of the topology of the network 12 while simultaneously contemplating the logical network encapsulation, OSI layer roles, and/or vendor-specific network implementations interconnecting the visualized topology. Simultaneously depicting both the two-dimensional physical layout of the network elements and the various "layers" or technologies that each network element participates in requires more than two dimensions and cannot be done with conventional, extant network graph drawing techniques.

Figure 1:
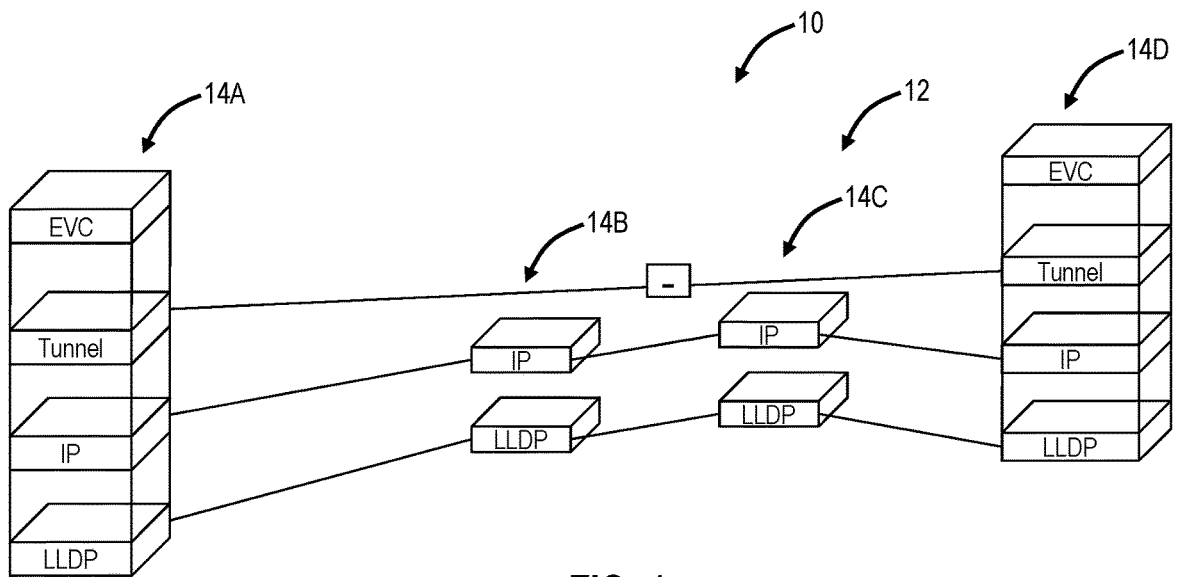
FIG. 1 is a UI with four network elements.
Figure 2:
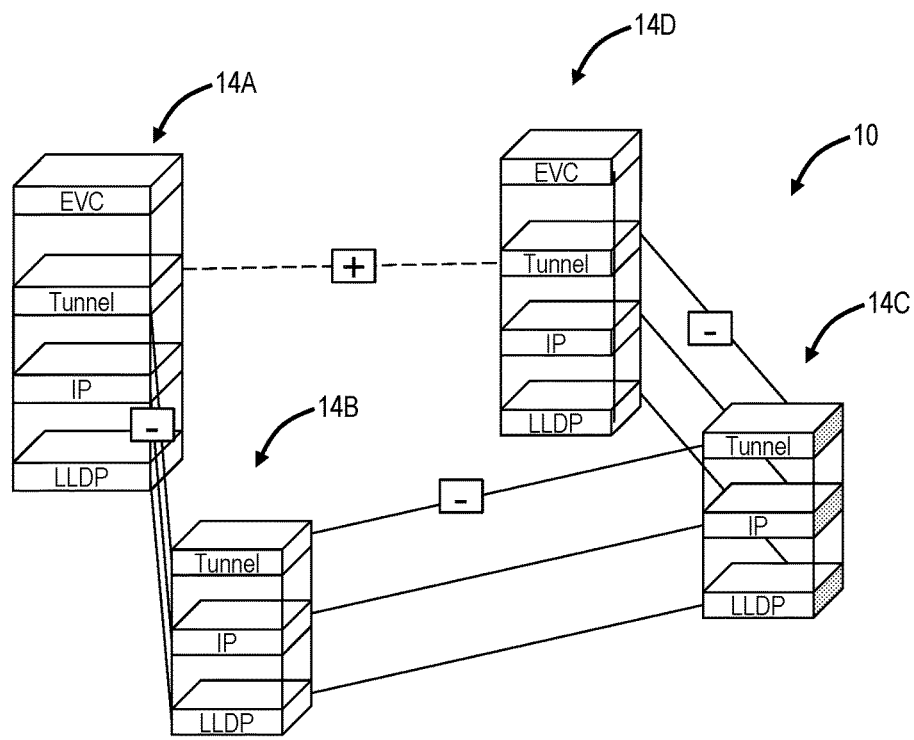
FIG. 2 is another UI also with four network elements.

FIG. 1 is a UI 10 with four network elements 14A-14D. FIG. 2 is another UI 10 also with four network elements 14A-14D. The UI 10 includes both a vertical dimension and a horizontal dimension. In the vertical dimension, at each network element 14, the depiction displays the various network layers that the given network context contains. Because this can be to any arbitrary depth (or height) of network functionality described either in the OSI layer model, protocols within individual layers, or proprietary network solution implementations, network elements are depicted in the vertical dimension as dynamically sized "towers" that change size as necessary to indicate their participation in any specific layer or protocol of connectivity. For example, in FIG. 1, the network elements 14A, 14D include layers for Ethernet Virtual Circuit (EVC), a tunnel, Internet Protocol (IP), and Link Layer Discovery Protocol (LLDP). The network elements 14B, 14C include only the IP and LLDP layers. Thus, the network elements 14A, 14D are connected via a tunnel and an EVC that runs over an IP and LLDP layer that are at all network elements 14A-14D. Also, as described herein, "horizontal" means whole planes with breadth and depth, and "vertical" means a vertical height dimension.

Figure 3:
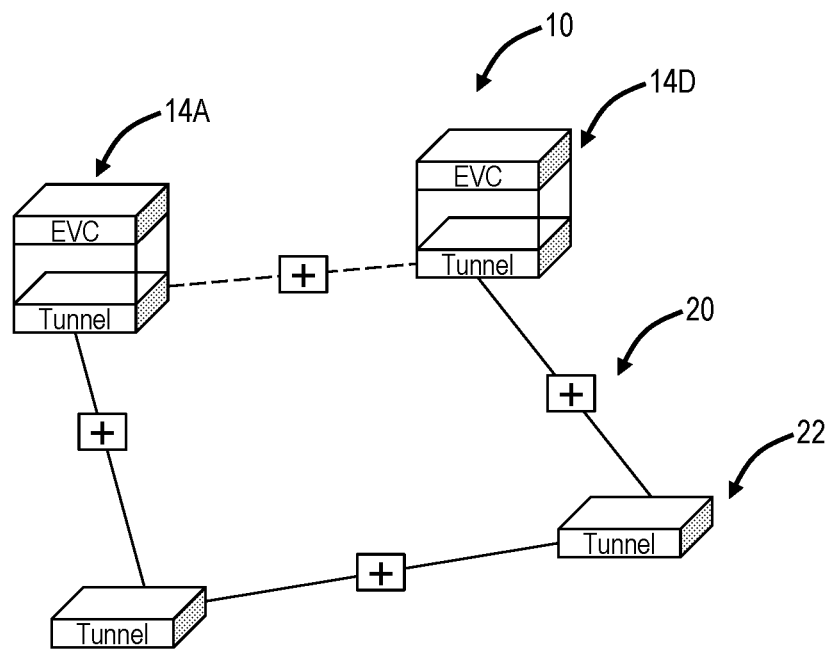
FIG. 3 is the UI with links collapsed.
Figure 4:
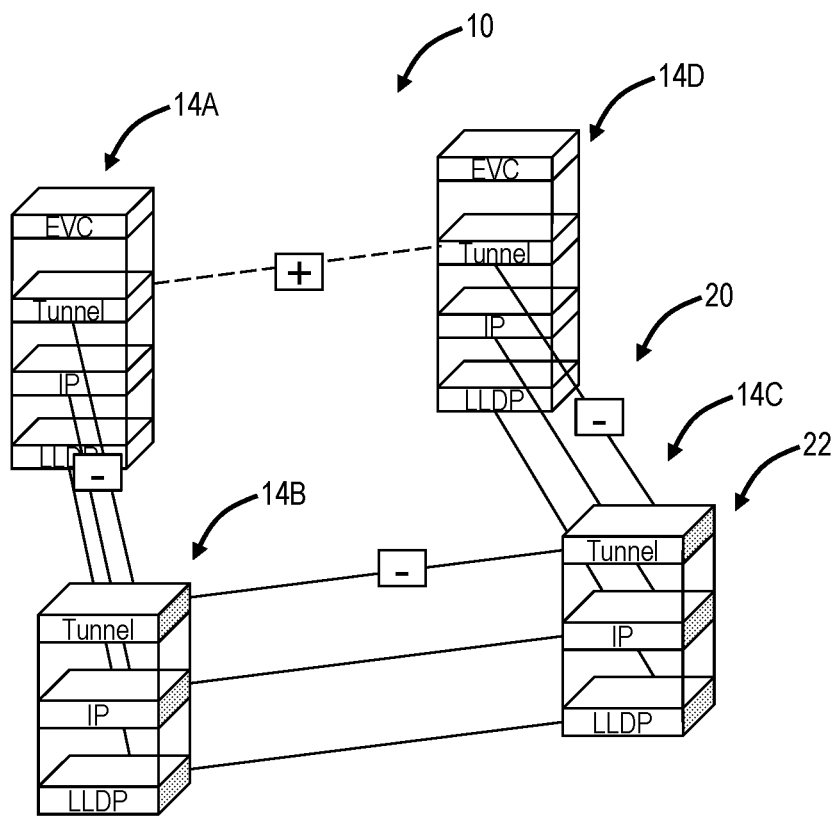
FIG. 4 is the UI with links expanded.

In addition, links between network elements that rely on lower-layer or support upper-layer connectivity feature a user experience (UX) affordance for "expanding" the link down or up. FIG. 3 is the UI 10 with links 20 collapsed, and FIG. 4 is the UI 10 with links 20 expanded. Expanding a given link 20 introduces the next necessary logical network layer into the depiction, including any network elements 14 not part of the current depiction but required to depict the additional layer introduced by the user interaction. Expansion can be by selecting (clicking) an icon (e.g., "+" or "−" or the like). In addition, network elements 14 already present in the screen will "grow" to the newly introduced layer if they participate in connectivity at that layer. Participation in each network layer is shown by the inclusion of a "plinth" 22 on any participating network element at each applicable layer. When a network element does not have connectivity or adaptation at a specific layer, the network element 14 is drawn with no plinth 22 for that layer, clearly indicating that the signal is fully encapsulated in a supporting layer and passing through that network element 14 transparently. In this example, FIG. 3 illustrates collapsed links 20 where all network elements 14 participate in the tunnel and only the network elements 14A, 14D participate in the EVC. After expanding the links in FIG. 4, the network elements 14A-14D all expand showing plinths 22 for LLDP, IP, tunnel, and EVC.

The use of individual plinths 22 to represent each network element's role in the network allows the depiction to include a multitude of network elements 14, each in a multitude of network roles, simultaneously. This allows the depiction to further inform the user of various network elements 14 states by decorating the plinths with useful network information such as alarm colors to indicate the highest severity alarm occurring on the NE at that layer, or otherwise visually encode statuses such as loss of connectivity or maintenance required on the NE at that layer.

Figure 5:
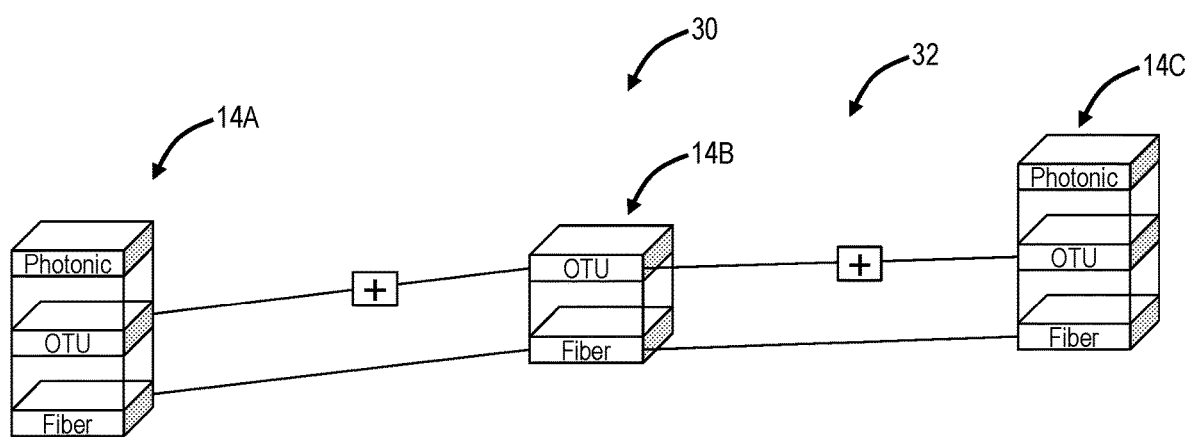
FIG. 5 is a UI of an optical network.
Figure 6:
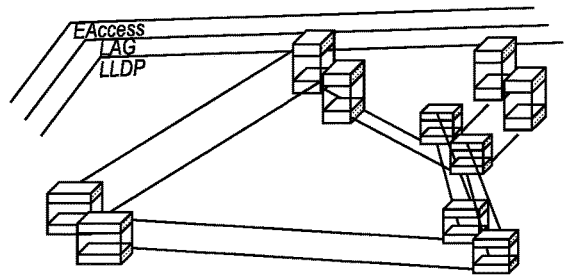
FIGS. 6-11 are UIs illustrating an animation sequence for tracing a service.
Figure 7:
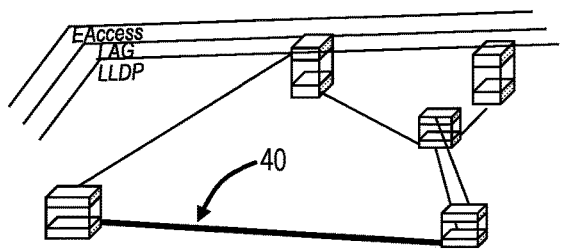
Figure 8:
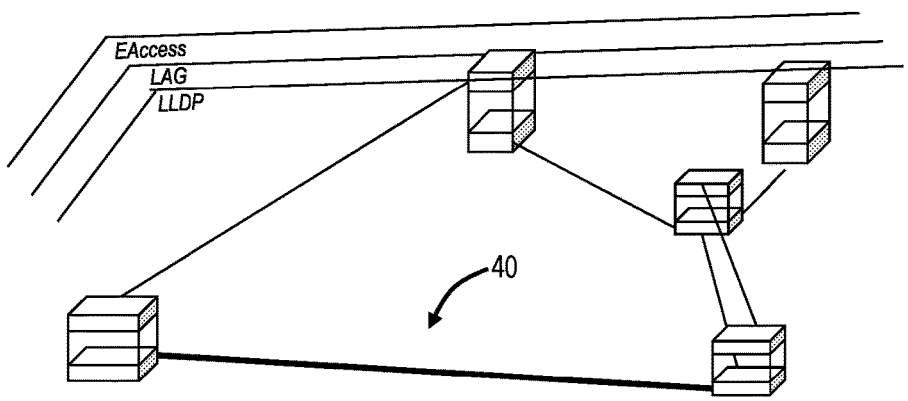
Figure 9:
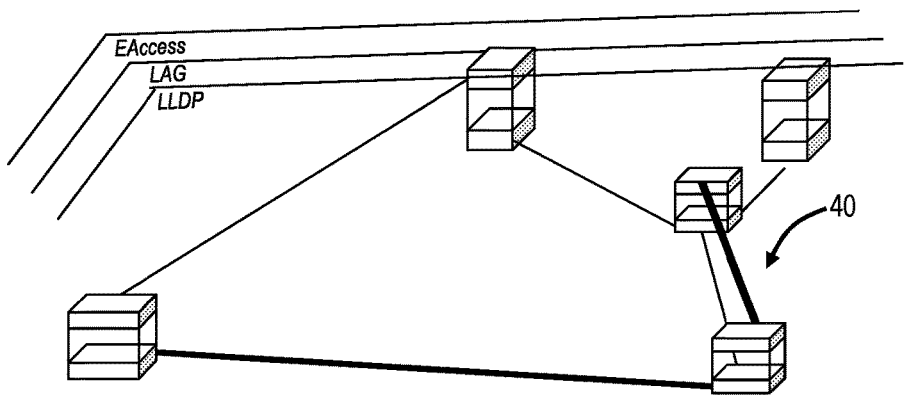
Figure 10:
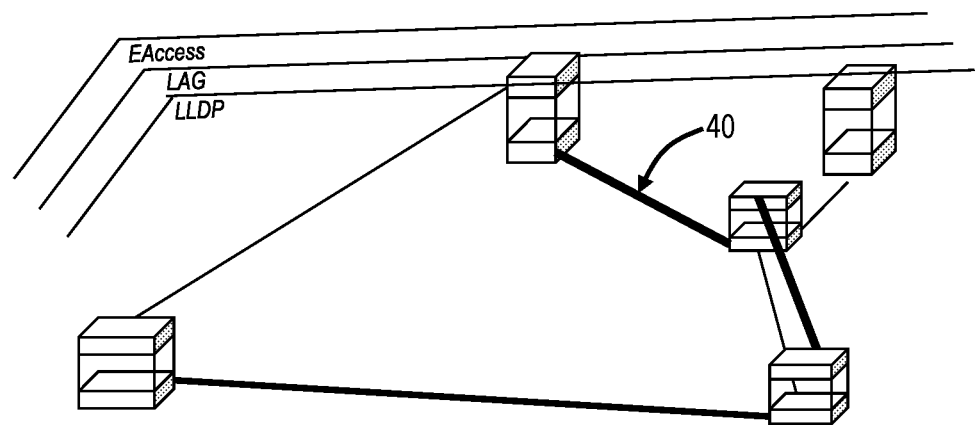
Figure 11:
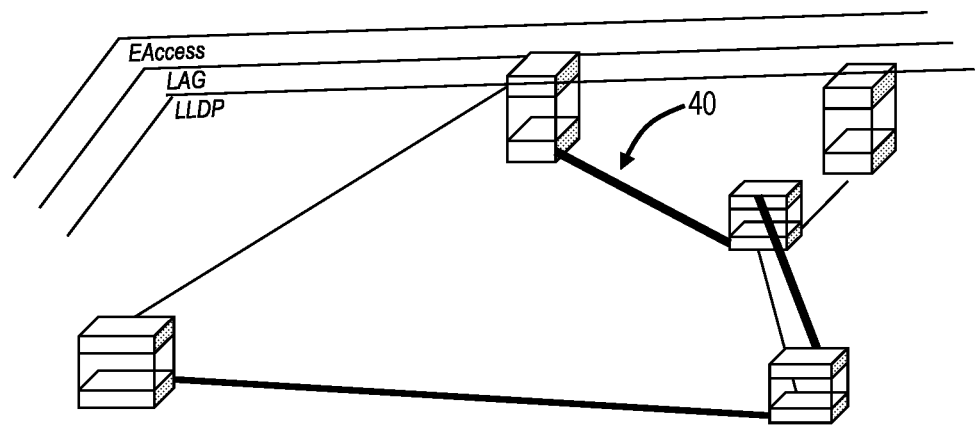
Figure 12:
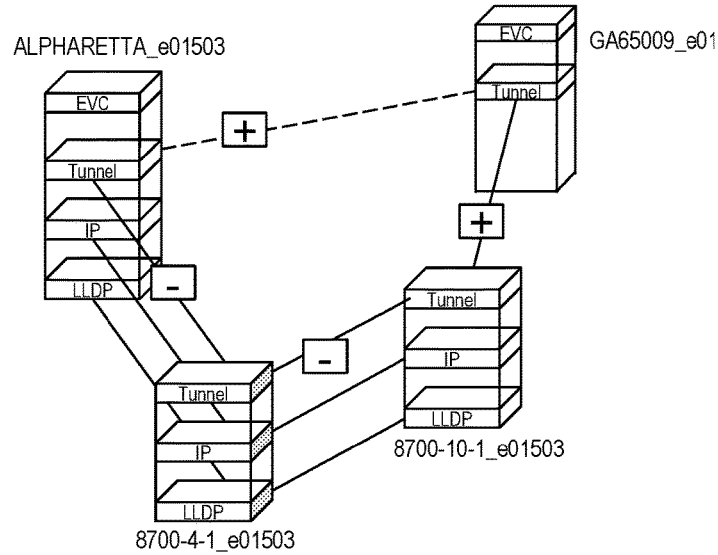
FIGS. 12-18 are UIs showing an animation sequence changing the change the horizontal and depth dimensions for a service.
Figure 13:
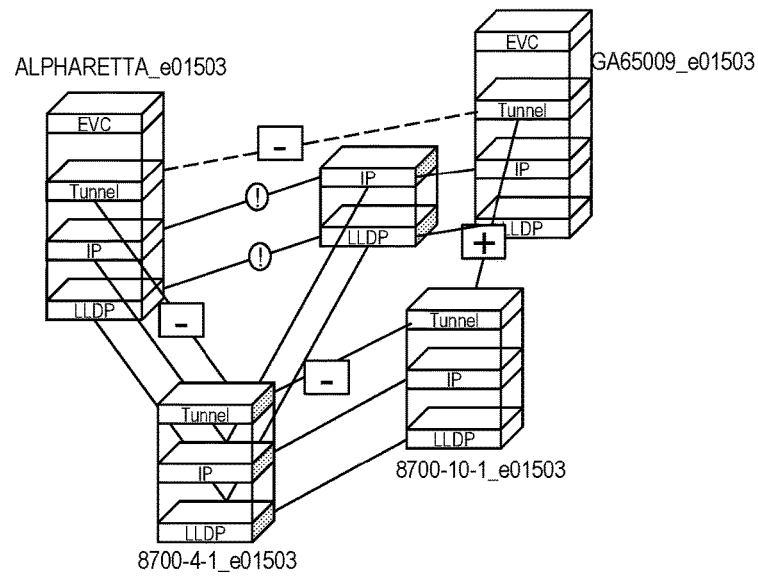
Figure 14:
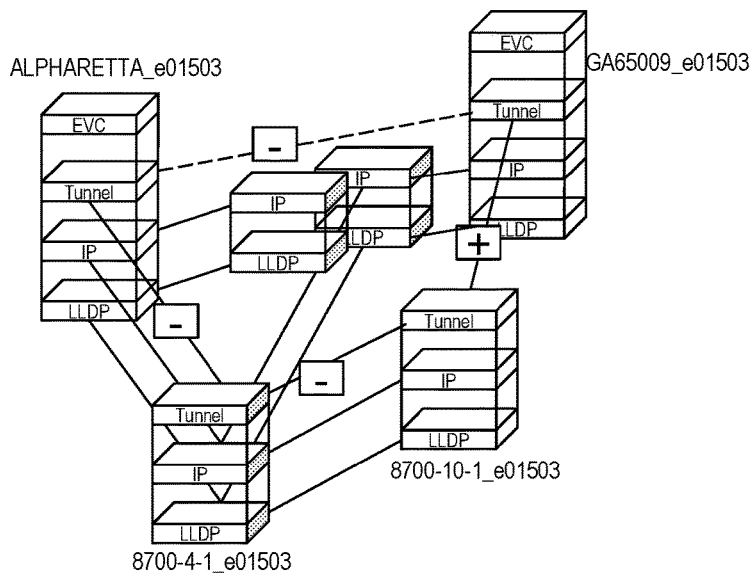
Figure 15:
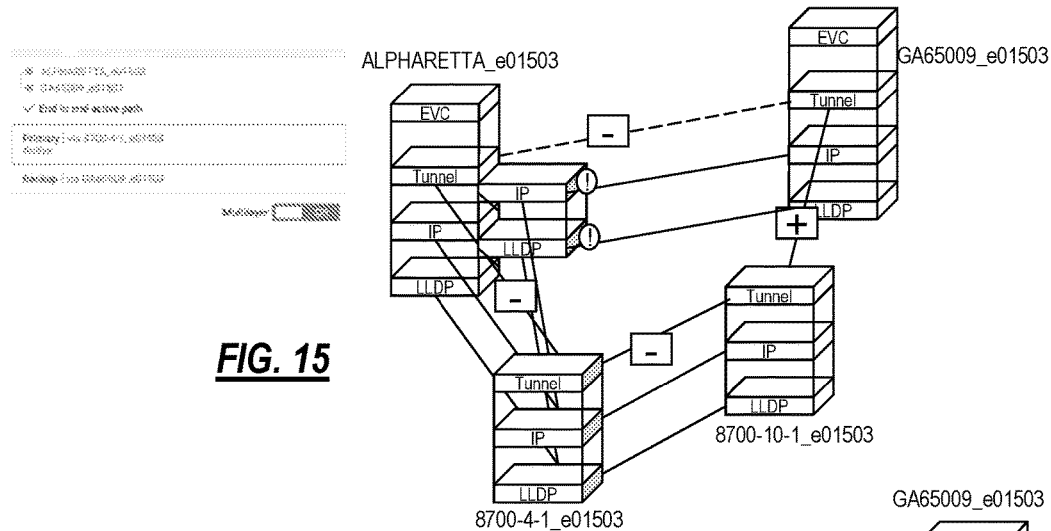
Figure 16:
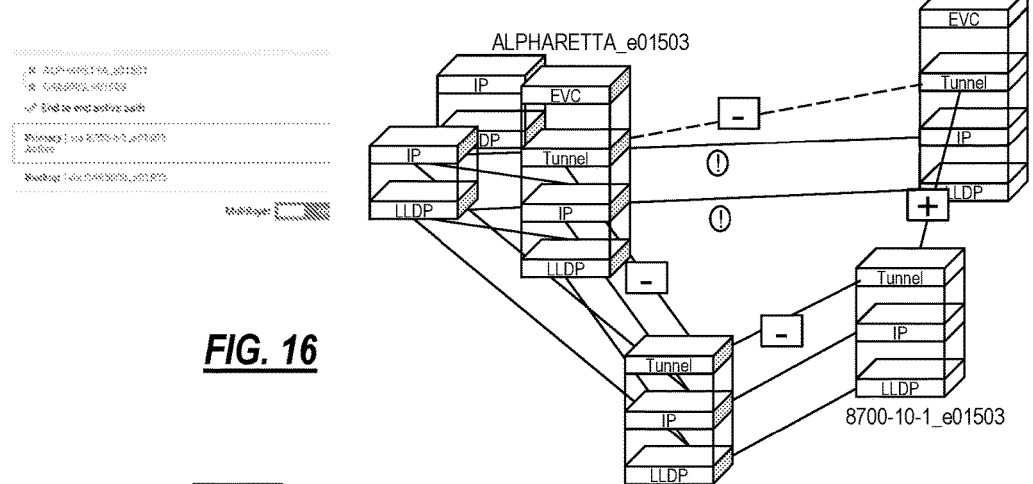
Figure 17:
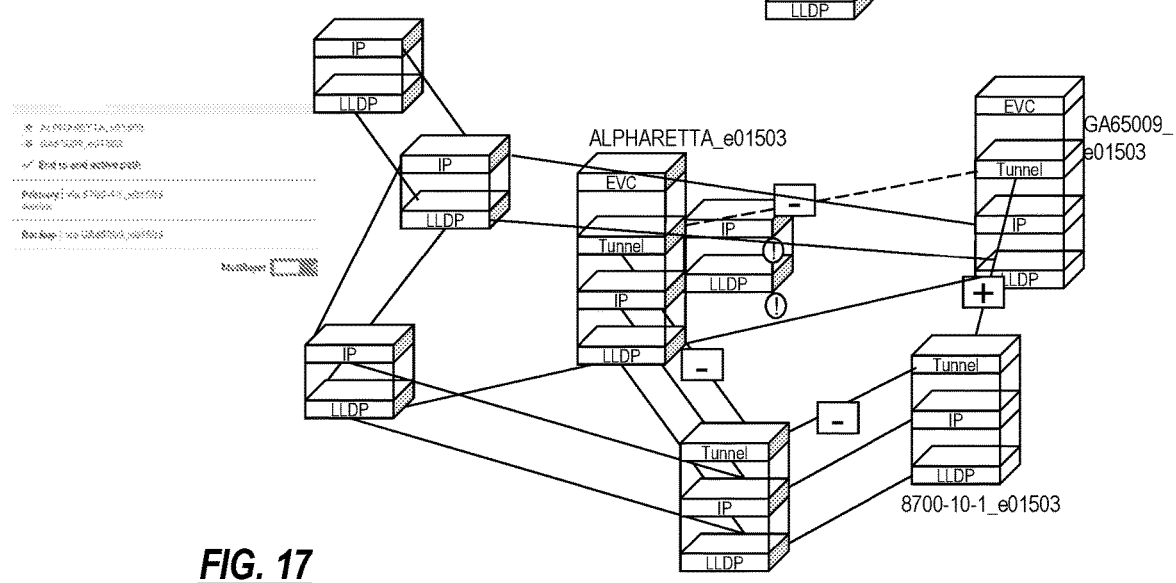
Figure 18:
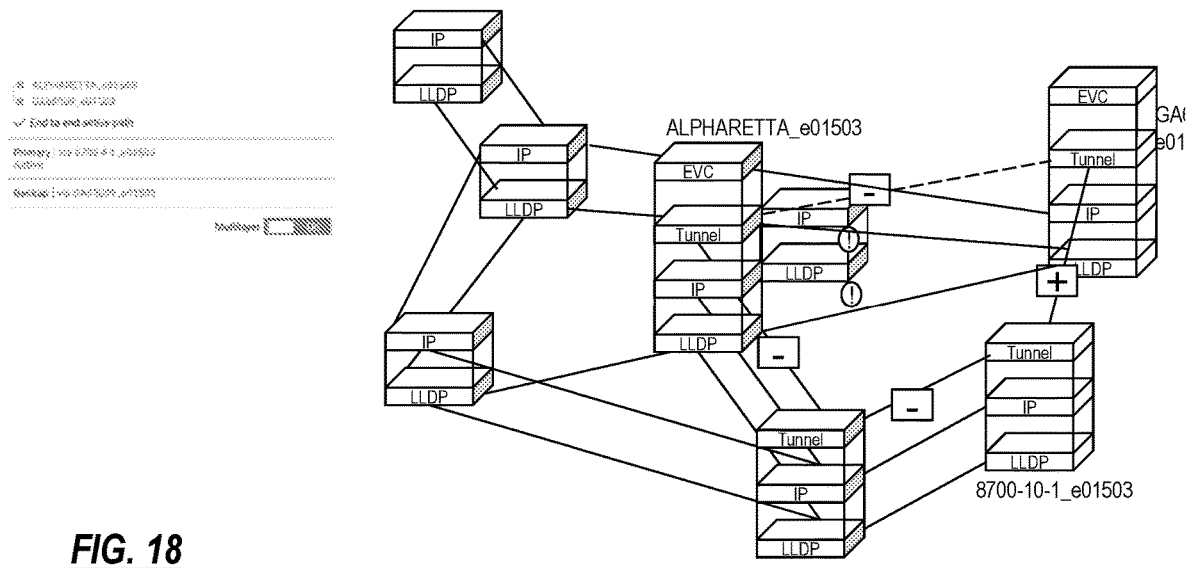
Figure 19:
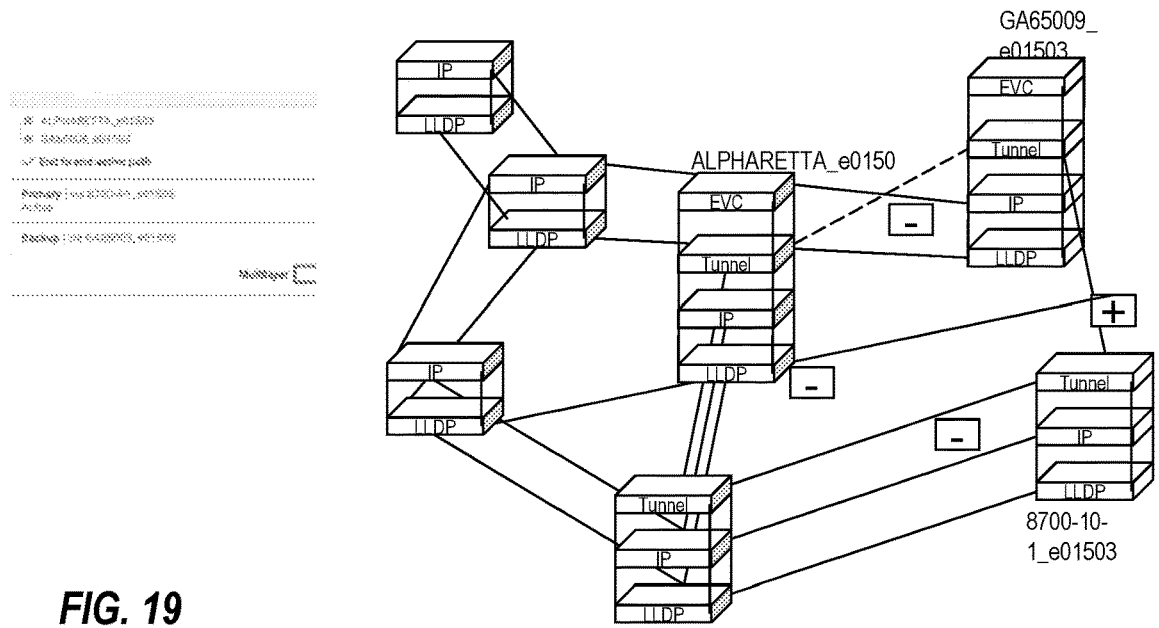
FIGS. 19-24 are an animation sequence of the UI showing the manipulation of perspective, zoom level, and panning.
Figure 20:
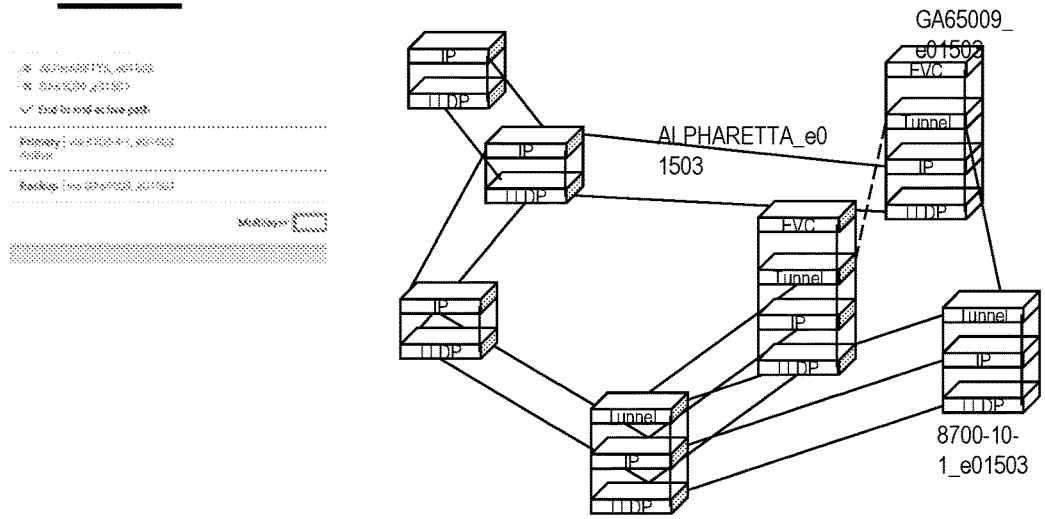
Figure 21:
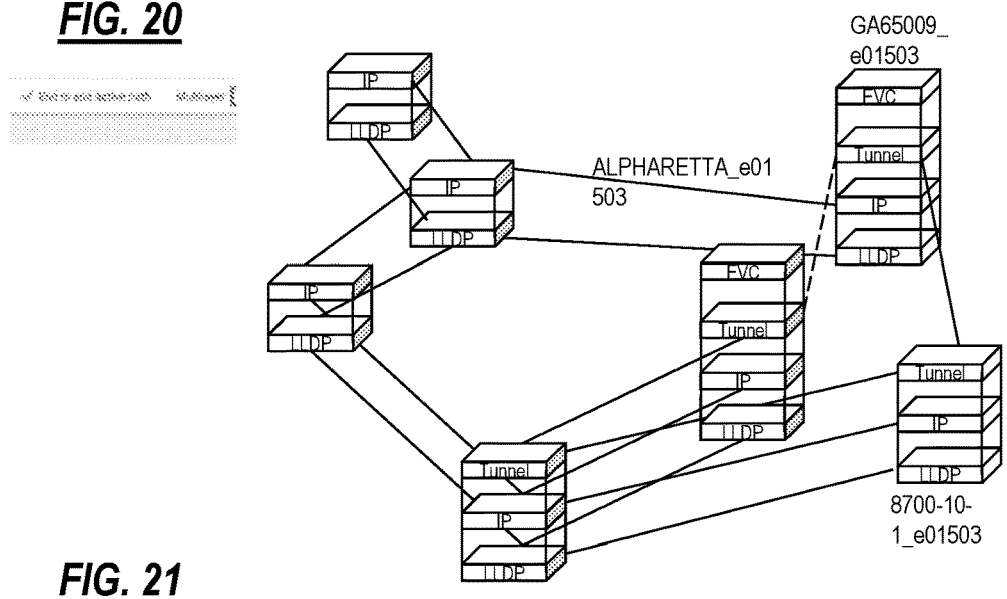
Figure 22:
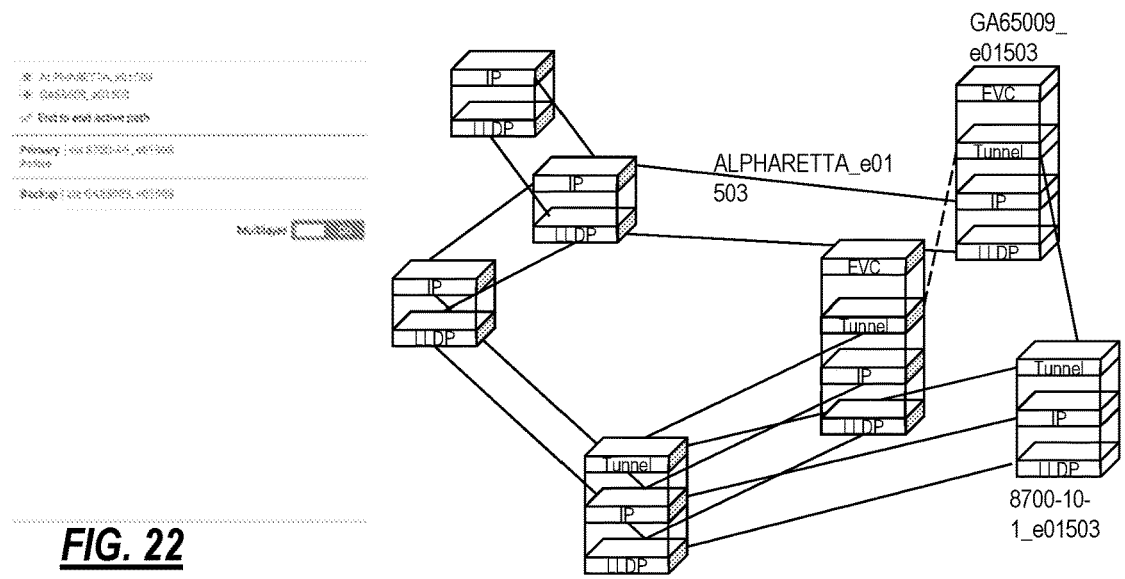
Figure 23:
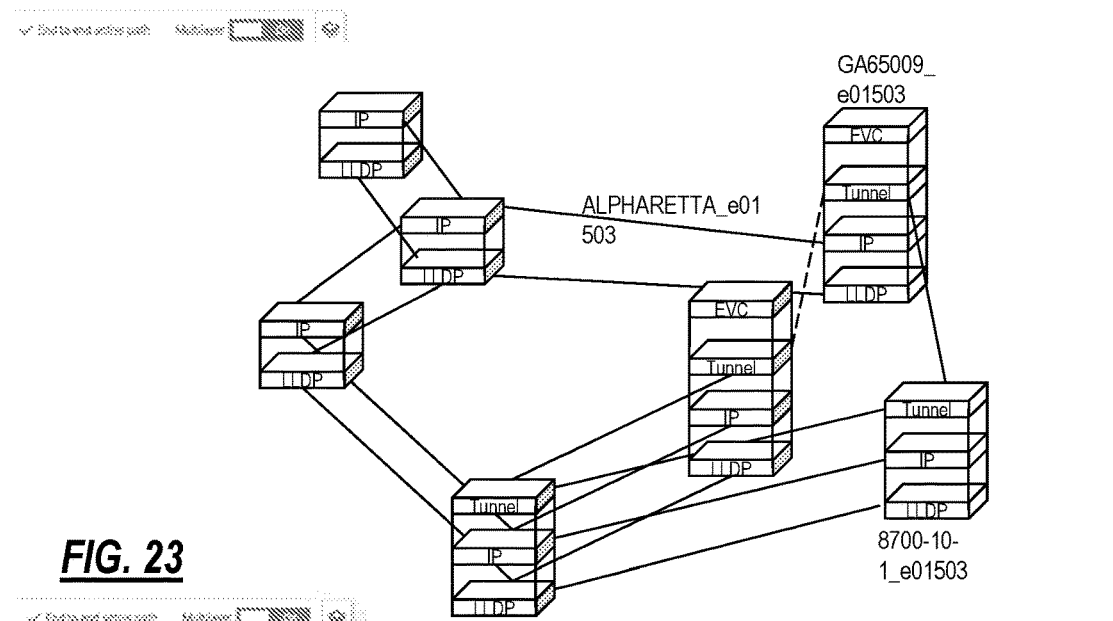
Figure 24:
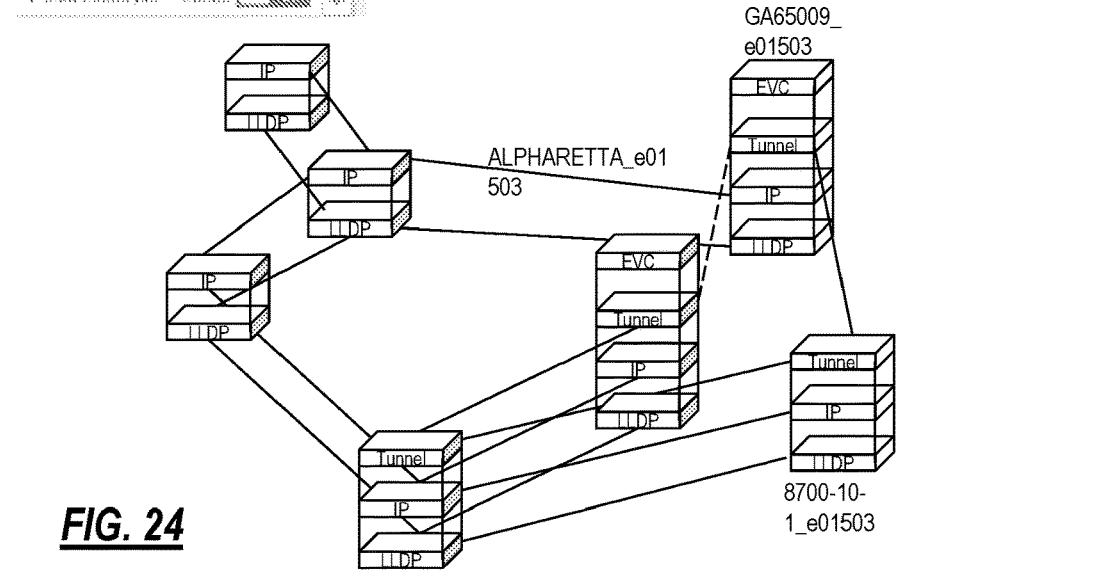

FIG. 5 is a UI 30 of an optical network 32. The network 12 in FIGS. 1-4 included layers for LLDP, IP, tunnel, and EVC, namely packet. In this example, the network 32 includes layers for fiber, optical transport network (OTN), and photonic (e.g., a reconfigurable optical add/drop multiplexer (ROADM)). By interacting with high-order services (such as IP, Ethernet, multiprotocol label switching (MPLS), etc) via user selection, the UI 10, 30 can be triggered to visually highlight a service's lower-layer connectivity visually on the screen without requiring the user to change views. This tracing is done in an animated fashion from one end of the service to the other, allowing the user to easily understand the exact network elements and logical layers supported by those elements that the service in question traverses. This is illustrated in the animation sequence in FIGS. 6-11 where UIs illustrate tracing a service 40. By animation sequence, this means each subsequent FIG. shows a next step.

In the horizontal and depth dimensions, the depiction shows logical and physical layout of the network elements and the links creating connectivity between them. Where interactions described in the previous paragraphs of this section require the layout to change in the horizontal and depth dimensions, the layout change to this new state is done over time via animation. This allows the user to visually trace the elements in the layout as they move to their new positions, preserving valuable network context understanding that has been gained by studying the depiction in its original or previous state. This is illustrated in the animation sequence in FIGS. 12-18.

The animation sequence maintains valuable contextual information in the display when the layout of elements within the display must change to accommodate the instruction made by user interaction. Network elements that change position when navigating between contexts are animated to their new positions.

The present disclosure also intelligently reduces visual clutter and thereby enhance comprehensibility of the view where possible. For example, where linkage between two network elements is accomplished with more than one physical or logical link, such as a Link Aggregation Group (LAG) composed of two individual ethernet links, a UX affordance is provided that when interacted with allows the user to specify a particular link in the group to display. This affordance is displayed as an overlay on the link representation. Additionally, these are used to decide which network layers are redundant or otherwise non-interesting to the user, and thereby condense or compress layers to reduce complex yet uninteresting layers into either single logical layers or groups. One example of this would be to detect that the optical data unit (ODU), OTN, and fiber layers of optical connectivity trace the exact same topology, and therefore can be reduced to a logical layer called "optical."

The UI can display any arbitrary layer of network connectivity for which there is correlation data, based on user selection. This allows display of highly encapsulated services such as IP virtual private network (VPN), MPLS, etc, directly over the fiber optic route that it will take, and view any number of the logical layers of encapsulation between them, in the same display.

FIGS. 19-24 are an animation sequence of the UI showing the manipulation of perspective, zoom level, and panning in 360-degree space, allowing for an unlimited number of views from which to better understand displays of complex intersections of topological and encapsulation contexts.

Figure 25:
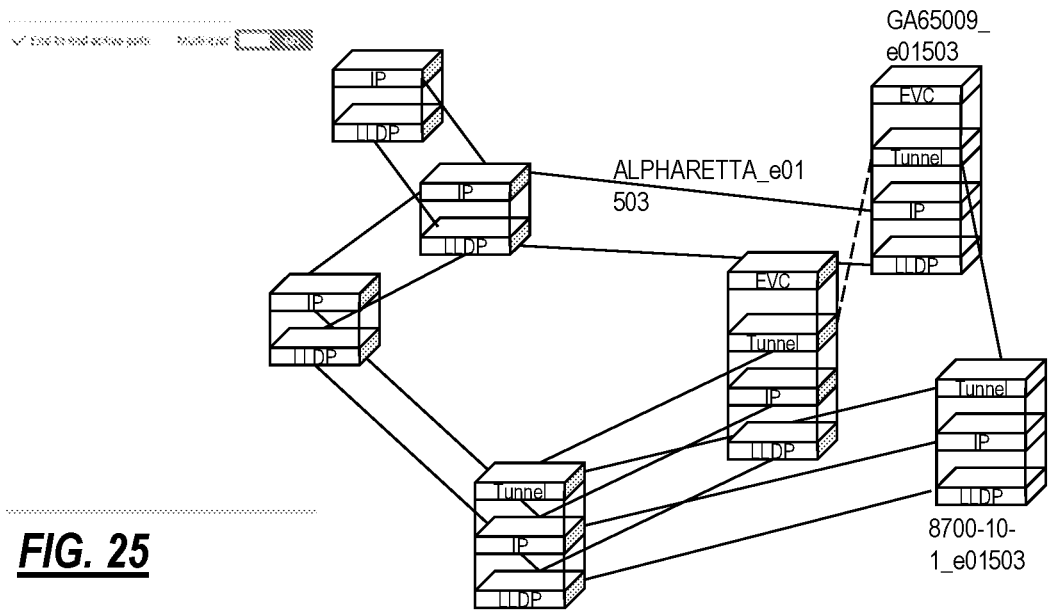
FIGS. 25-26 are the UI illustrating before a mouse hove (FIG. 25) and after a mouse hover (FIG. 26).
Figure 26:
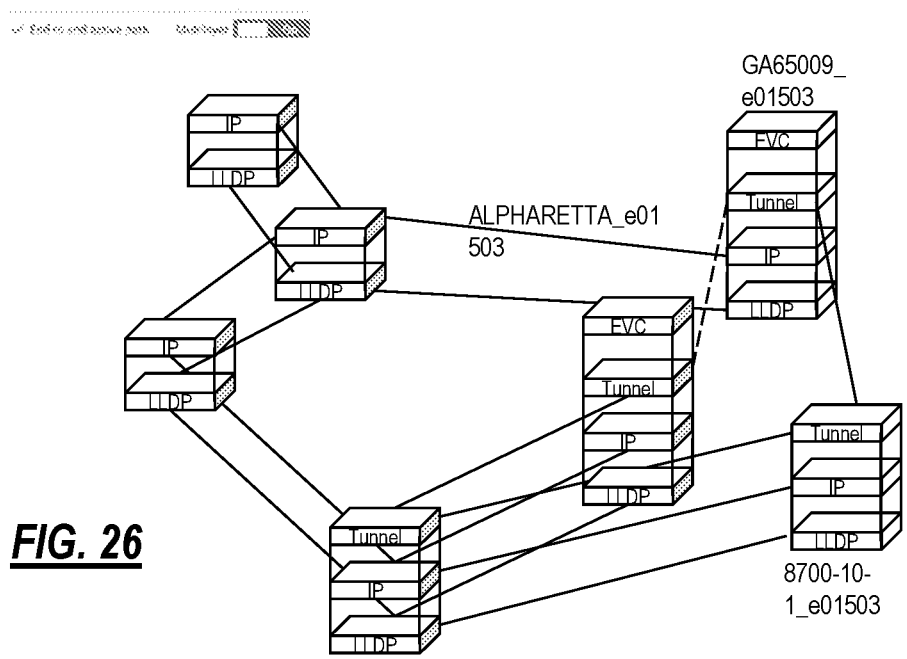

FIGS. 25-26 are the UI illustrating before a mouse hover (FIG. 25) and after a mouse hover (FIG. 26). This allows the user to then select a sub-context within the displayed context by hovering the mouse over a higher-order entity to highlight what lower-layer entities it relies on. This is a quick and easy method to understand multiple sub-contexts that exist within the context being displayed.

The use of all three dimensions on the screen combined with our novel algorithms therefore allows the depiction to display 1) any arbitrary network topology context with any 2) relevant logical connectivity context simultaneously, creating a coherent and comprehensible depiction of the entire network context in question in a single, interactive, navigable view.

Figure 27:
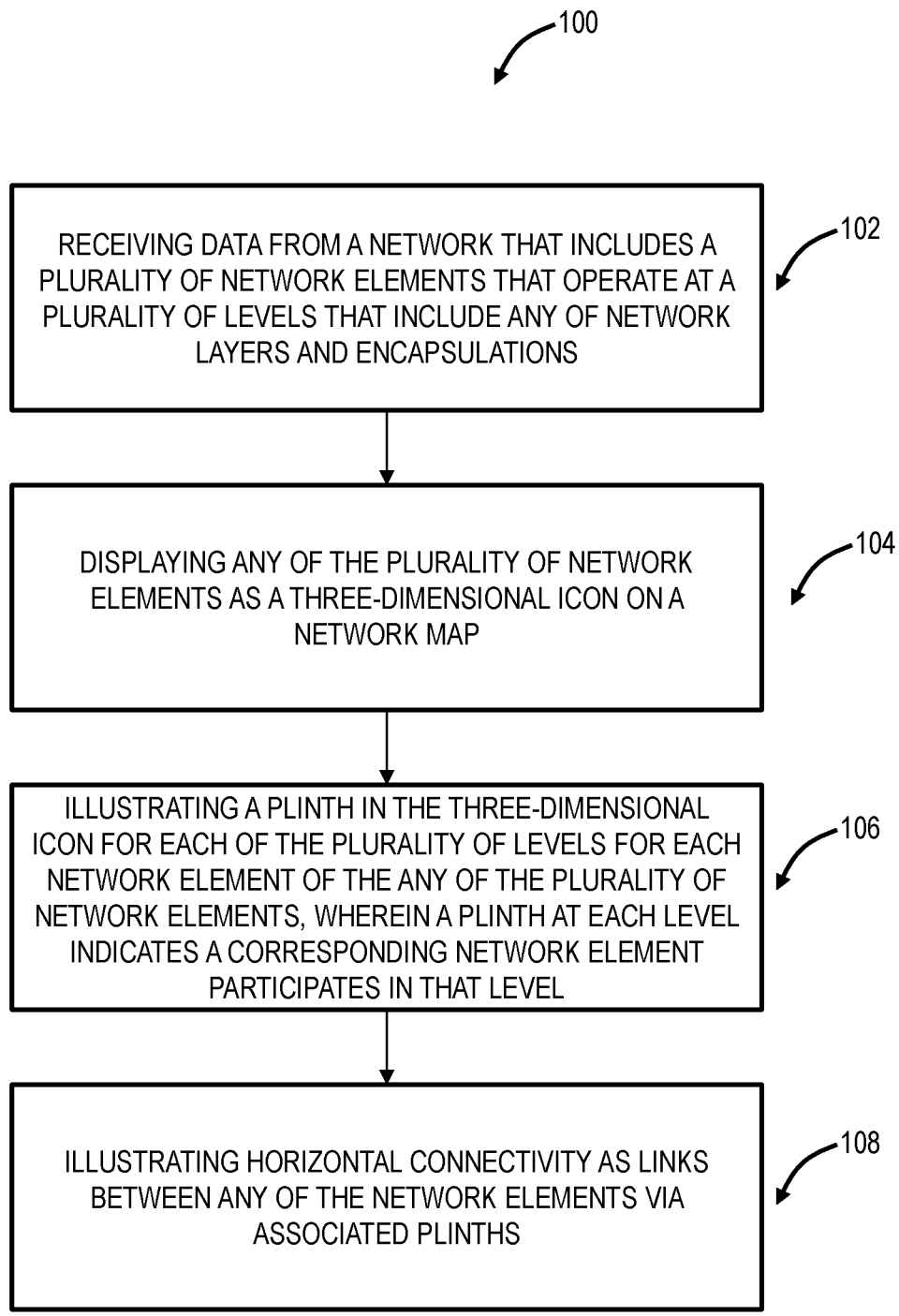
FIG. 27 is a flowchart of a process for three-dimensional visualizations of a network.

FIG. 27 is a flowchart of a process 100 for three-dimensional visualizations of a network. The process 100 can be realized as a method having steps, a system including at least one processor and memory with instructions that, when executed, cause the at least one processor to implement the steps, and a non-transitory computer-readable medium having instructions stored thereon for programming at least one processor to perform the steps.

The steps include receiving data from a network that includes a plurality of network elements that operate at a plurality of levels that include any of network layers and encapsulations (step 102); displaying any of the plurality of network elements as a three-dimensional icon on a network map (step 104); illustrating a plinth in the three-dimensional icon for each of the plurality of levels for each network element of the any of the plurality of network elements, wherein a plinth at each level indicates a corresponding network element participates in that level (step 106); and illustrating horizontal connectivity as links between any of the network elements via associated plinths (step 108).

Note, not every network element necessarily has the same plinths based on its participation in the network. For example, an optical amplifier may only have optical related plinths whereas a ROADM may include optical related plinths and packet related plinths. The steps can include receiving a selection on any link and one of expanding or collapsing the three-dimensional icon based thereon. The network layers can include any of optical, time division multiplexed, and packet. The encapsulations can include protocols within the network layers as well as protocols in different network layers. The plurality of levels can include a combined level for any of fiber, optical transport network, and optical data unit.

The encapsulations can include any of link layer discovery protocol (LLDP), internet protocol (IP), tunnel, ethernet virtual circuit (EVC), virtual private network (VPN), multiprotocol label switching (MPLS), and segment routing. The steps can include displaying operations, administration, and maintenance (OAM) information in the plurality of levels at the same time when the three-dimensional icon is expanded. The steps can include tracing a service from a source to a destination and through the plurality of levels at any of the plurality of network elements. The steps can include, responsive to user input, any of panning, rotating, and zooming in or out in the network map.

1) Simultaneous display of arbitrary topological and connectivity contexts. The present disclosure makes novel use of 3D to draw network elements and the connectivity between them, and as a result, can join arbitrary levels of both two-dimensional topological context and logical encapsulation context. This summary represents multiple significant elements of novelty added to the basic concept of viewing a network in 3D.

2) Ability to trace logical service paths in three dimensions through topological and logical infrastructure. This aspect of the present disclosure builds on the previous aspect #1 by showing both the two-dimensional topological outline of a service as well as the network layers it traverses in the third dimension. This allows the display to add the service path trace information without reducing any of the extant contextual information on the screen.

3) Ability to display a network element in three dimensions in arbitrary network roles. This aspect builds on aspect #1 and presents a network element as a dynamic entity that changes size and representation to indicate visually how it participates or abstains from various network roles implicated in the presently displayed network context.

4) Ability to display operations, administration, and maintenance statuses for a multitude of network roles on a single network element simultaneously. This aspect builds on aspect #3 and allows the dynamically drawn network element to display multiple vectors of applicable status information that cannot be displayed in a single two-dimensional view.

5) Ability to intelligently detect redundant or obvious network layer or topology information and condense the depiction accordingly Congruent layers This aspect allows the view to reduce clutter and optimize for visual readability without compromising important contextual information. This aspect builds on the aspects detailed in #1 and #3.

6) Hide or show arbitrary layers to see highly encapsulated services directly over low-layer infrastructure. Macro layers—select which layers are in the depiction—without losing connectivity. This aspect allows the user to select and join arbitrary layers of network context into a single view, enabling the visual tracing of highly encapsulated services directly over lower-layer infrastructure in one display.

7) Ability to overlay operations, administration, and maintenance information in various levels of detail simultaneously. Building on aspects #1, #3, and #4, this allows the display to show common overlay information such as utilization, alarms, and traffic flow in multiple levels of detail simultaneously, such as the full utilization of an optical line shown below the partial utilizations of the various higher-order links that optical line supports, or the total summary of a network element's alarms broken down into the various alarms occurring at various network layers without requiring the user to change views.

8) Animation between visual depiction states of the display to preserve network context. When the layout on the screen must change, due to either the introduction of new network elements or topology into a logical layout, or the change from logical to geographic layout, the extant network elements on the screen are animated to their new positions in the new layout. Any existing connectivity between the animated network elements is maintained visually over the course of the animation. This allows the display to change the scope of the overall network context being displayed without requiring the user to change views.

By using novel visual modeling and algorithms, the present disclosure allows both topological and network encapsulation contexts to be viewed simultaneously, at arbitrary levels of detail, thereby allowing the user novel means to specify exactly what and how much network context to view in a given display. By using novel visual modeling techniques and algorithms, the present disclosure makes use of the third dimension to visually relate information on the screen in a way that is both more spatially compact and more visually parse-able by the user. This reduces the amount of screen adjusting, zooming, panning, or other navigation required for the user to glean the same amount of information.

By using novel visual modeling techniques and algorithms, the present disclosure makes use of animation and real-time rendering to preserve network contexts on the screen even as the user adjusts the scope of the context in view, increases the density of the view, or causes a change in layout of the view. The present disclosure includes finding and tracing the three-dimensional route that traffic on a higher-order service will take over underlying infrastructure. This allows the user to see the topological route the signal will take between devices as well as how the signal will move through the encapsulation layers within the device simultaneously.

The present disclosure correlates multi-layer networking data to visual elements in the display across various layers of encapsulation thereby highlighting linear network entities not only across the topological context but through the network encapsulation context as well.

Example Server Architecture

Figure 28:
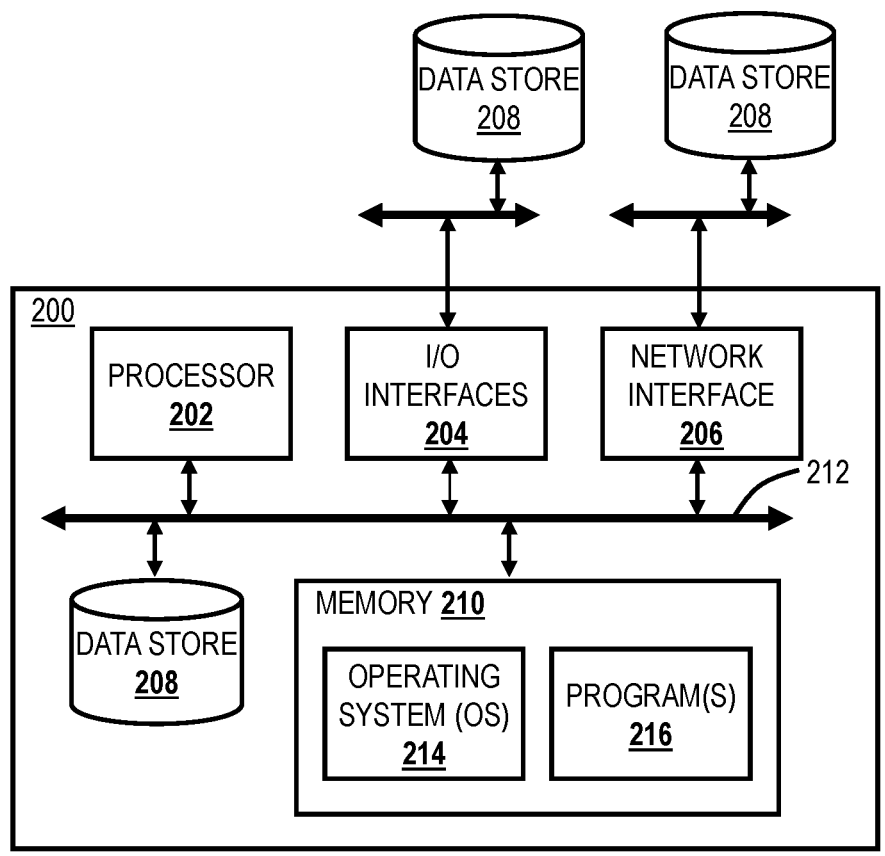
FIG. 28 is a block diagram of a server.

FIG. 28 is a block diagram of a server 200. The server 200 may be a digital computer that, in terms of hardware architecture, generally includes a processor 202, input/output (I/O) interfaces 204, a network interface 206, a data store 208, and memory 210. It should be appreciated by those of ordinary skill in the art that FIG. 28 depicts the server 200 in an oversimplified manner, and a practical embodiment may include additional components and suitably configured processing logic to support known or conventional operating features that are not described in detail herein. The components (202, 204, 206, 208, and 210) are communicatively coupled via a local interface 212. The local interface 212 may be, for example, but not limited to, one or more buses or other wired or wireless connections, as is known in the art. The local interface 212 may have additional elements, which are omitted for simplicity, such as controllers, buffers (caches), drivers, repeaters, and receivers, among many others, to enable communications. Further, the local interface 212 may include address, control, and/or data connections to enable appropriate communications among the aforementioned components.

The processor 202 is a hardware device for executing software instructions. The processor 202 may be any custom made or commercially available processor, a Central Processing Unit (CPU), an auxiliary processor among several processors associated with the server 200, a semiconductor-based microprocessor (in the form of a microchip or chipset), or generally any device for executing software instructions. When the server 200 is in operation, the processor 202 is configured to execute software stored within the memory 210, to communicate data to and from the memory 210, and to generally control operations of the server 200 pursuant to the software instructions. The I/O interfaces 204 may be used to receive user input from and/or for providing system output to one or more devices or components.

The network interface 206 may be used to enable the server 200 to communicate on a network, such as the Internet 104. The network interface 206 may include, for example, an Ethernet card or adapter or a Wireless Local Area Network (WLAN) card or adapter. The network interface 206 may include address, control, and/or data connections to enable appropriate communications on the network. A data store 208 may be used to store data. The data store 208 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof.

Moreover, the data store 208 may incorporate electronic, magnetic, optical, and/or other types of storage media. In one example, the data store 208 may be located internal to the server 200, such as, for example, an internal hard drive connected to the local interface 212 in the server 200. Additionally, in another embodiment, the data store 208 may be located external to the server 200 such as, for example, an external hard drive connected to the I/O interfaces 204 (e.g., SCSI or USB connection). In a further embodiment, the data store 208 may be connected to the server 200 through a network, such as, for example, a network-attached file server.

The memory 210 may include any of volatile memory elements (e.g., random access memory (RAM, such as DRAM, SRAM, SDRAM, etc.)), nonvolatile memory elements (e.g., ROM, hard drive, tape, CDROM, etc.), and combinations thereof. Moreover, the memory 210 may incorporate electronic, magnetic, optical, and/or other types of storage media. Note that the memory 210 may have a distributed architecture, where various components are situated remotely from one another but can be accessed by the processor 202. The software in memory 210 may include one or more software programs, each of which includes an ordered listing of executable instructions for implementing logical functions. The software in the memory 210 includes a suitable Operating System (O/S) 214 and one or more programs 216. The operating system 214 essentially controls the execution of other computer programs, such as the one or more programs 216, and provides scheduling, input-output control, file and data management, memory management, and communication control and related services. The one or more programs 216 may be configured to implement the various processes, algorithms, methods, techniques, etc. described herein.

It will be appreciated that some embodiments described herein may include or utilize one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field-Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application-Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured to," "logic configured to," etc. perform a set of operations, steps, methods, processes, algorithms, functions, techniques, etc. on digital and/or analog signals as described herein for the various embodiments.

Moreover, some embodiments may include a non-transitory computer-readable medium having instructions stored thereon for programming a computer, server, appliance, device, at least one processor, circuit/circuitry, etc. to perform functions as described and claimed herein. Examples of such non-transitory computer-readable medium include, but are not limited to, a hard disk, an optical storage device, a magnetic storage device, a Read-Only Memory (ROM), a Programmable ROM (PROM), an Erasable PROM (EPROM), an Electrically EPROM (EEPROM), Flash memory, and the like. When stored in the non-transitory computer-readable medium, software can include instructions executable by one or more processors (e.g., any type of programmable circuitry or logic) that, in response to such execution, cause the one or more processors to perform a set of operations, steps, methods, processes, algorithms, functions, techniques, etc. as described herein for the various embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims. Moreover, it is noted that the various elements, operations, steps, methods, processes, algorithms, functions, techniques, etc. described herein can be used in any and all combinations with each other.

What is claimed is:

1. A non-transitory computer-readable medium storing instructions executable by one or more processors that cause the one or more processors to perform steps of:
receiving data associated with a network, wherein the network includes interconnected network elements that operate at a plurality of levels that include any of network layers and encapsulations;

displaying a plurality of three-dimensional icons each represent one of a plurality of network elements of the interconnected network elements, wherein the plurality of three-dimensional icons include both a physical representation at one or more of the network layers and a logical representation of one or more of the encapsulations; and displaying links between the plurality of three-dimensional icons each link representing one of a network layer connection and an encapsulation connection.

2. The non-transitory computer-readable medium of claim 1, wherein the steps include displaying operations, administration, and maintenance (OAM) status for a multitude of network roles on a single network element simultaneously.

3. The non-transitory computer-readable medium of claim 1, wherein the plurality of three-dimensional icons include at least two icons of different height.

4. The non-transitory computer-readable medium of claim 1, wherein the plurality of three-dimensional icons include at least two icons lacking links at a given depth thereby indicating no support of that layer or encapsulation.

5. The non-transitory computer-readable medium of claim 1, wherein the steps include receiving a user selection of a higher-order service and displaying a highlight of the higher-order service's lower layer connectivity.

6. The non-transitory computer-readable medium of claim 5, wherein the higher-order service is one of Internet Protocol, Ethernet, and Multiprotocol Label Switching.

7. The non-transitory computer-readable medium of claim 1, wherein the steps include responsive to one or more links between given three-dimensional icons being one or more of redundant, related, and non-interesting, displaying the one or more links as compressed with a logical layer label.

8. A non-transitory computer-readable medium storing instructions executable by one or more processors that cause the one or more processors to perform steps of:

receiving data associated with a network, wherein the network includes interconnected network elements that operate at a plurality of levels that include any of network layers and encapsulations;

displaying a plurality of three-dimensional icons each represent one of a plurality of network elements of the interconnected network elements;

displaying links between the plurality of three-dimensional icons each link representing one of a network layer connection and an encapsulation connection; and receiving a user selection of a higher-order service and displaying a highlight of the higher-order service's lower layer connectivity.

9. The non-transitory computer-readable medium of claim 8, wherein the steps include displaying operations, administration, and maintenance (OAM) status for a multitude of network roles on a single network element simultaneously.

10. The non-transitory computer-readable medium of claim 8, wherein the plurality of three-dimensional icons include both a physical representation at one or more of the network layers and a logical representation of one or more of the encapsulations.

11. The non-transitory computer-readable medium of claim 8, wherein the plurality of three-dimensional icons include at least two icons of different height.

12. The non-transitory computer-readable medium of claim 8, wherein the plurality of three-dimensional icons include at least two icons lacking links at a given depth thereby indicating no support of that layer or encapsulation.

13. The non-transitory computer-readable medium of claim 8, wherein the higher-order service is one of Internet Protocol, Ethernet, and Multiprotocol Label Switching.

14. The non-transitory computer-readable medium of claim 8, wherein the steps include responsive to one or more links between given three-dimensional icons being one or more of redundant, related, and non-interesting, displaying the one or more links as compressed with a logical layer label.

15. A non-transitory computer-readable medium storing instructions executable by one or more processors that cause the one or more processors to perform steps of:

receiving data associated with a network, wherein the network includes interconnected network elements that operate at a plurality of levels that include any of network layers and encapsulations;

displaying a plurality of three-dimensional icons each represent one of a plurality of network elements of the interconnected network elements, wherein the plurality of three-dimensional icons include at least two icons of different height; and displaying links between the plurality of three-dimensional icons each link representing one of a network layer connection and an encapsulation connection.

16. The non-transitory computer-readable medium of claim 15, wherein the steps include displaying operations, administration, and maintenance (OAM) status for a multitude of network roles on a single network element simultaneously.

17. The non-transitory computer-readable medium of claim 15, wherein the plurality of three-dimensional icons include both a physical representation at one or more of the network layers and a logical representation of one or more of the encapsulations.

18. The non-transitory computer-readable medium of claim 15, wherein the plurality of three-dimensional icons include at least two icons lacking links at a given depth thereby indicating no support of that layer or encapsulation.

19. The non-transitory computer-readable medium of claim 15, wherein the steps include receiving a user selection of a higher-order service and displaying a highlight of the higher-order service's lower layer connectivity.

20. The non-transitory computer-readable medium of claim 15, wherein the steps include responsive to one or more links between given three-dimensional icons being one or more of redundant, related, and non-interesting, displaying the one or more links as compressed with a logical layer label.

* * * * *